(No Model.)

F. W. BARRETT.
STATISTIC BOOK.

No. 444,060.                                     Patented Jan. 6, 1891.

Fig. 2.

| Names of Diseases. | Class | Sub Class | No. |
|---|---|---|---|
| Asiatic Cholera | I | 1 | 28 |
| Alcoholism, Intemperance | I | 3 | 3 |
| Anemia | II | 1 | 3 |
| Apoplexy | III | 1 | 4 |
| Boil | I | 1 | 22 |
| Blood Poisoning | I | 2 | 1 |
| Bronchitis | II | 3 | 5 |
| Croup | I | 1 | 10 |
| Cancer | II | 1 | 8 |
| Consumption | II | 1 | 3 |

RCH 31st. A.D. 18____

| Place of Residence | Vital Statistics | | |
|---|---|---|---|
| | Class | Sub Class | No. |
| | II | 1 | 3 |
| | II | 1 | 8 |

Fig. 1.

FORM No. 2.

Assessor's Report of Deaths in _____ in _____ County, Ohio, for the Year Ending March 31st, A.D. 18____

| McConnelly | Name in Full. | Sex | | Date of Death. | | | Condition | | | Age | | | Place of Death. | Place of Birth. | Occupation | Father's Name. | Mother's Name. | Color | | Disease or Cause of Death. | Place of Residence. | Vital Statistics | | |
|---|---|---|---|---|---|---|---|---|---|---|---|---|---|---|---|---|---|---|---|---|---|---|---|---|
| | | Male | Fem. | Yr. | Mo. | Day. | M'k'd. | Sing. | W'd. | Yr. | Mo. | Day. | | | | | | White | Col'd | | | Class | Sub Class | No. |
| | | | | | | | | | | | | | | | | | | | | Anemia | F | II | 1 | 3 |
| | | | | | | | | | | | | | | | | | | | | Cancer | F | II | 1 | 8 |
| | | | | | | | | | | | | | | | | | | | | | F | | | |

WITNESSES
H. M. Plaisted
Warren Hull

INVENTOR
F. W. Barrett,
By H. A. Taulman
his Attorney.

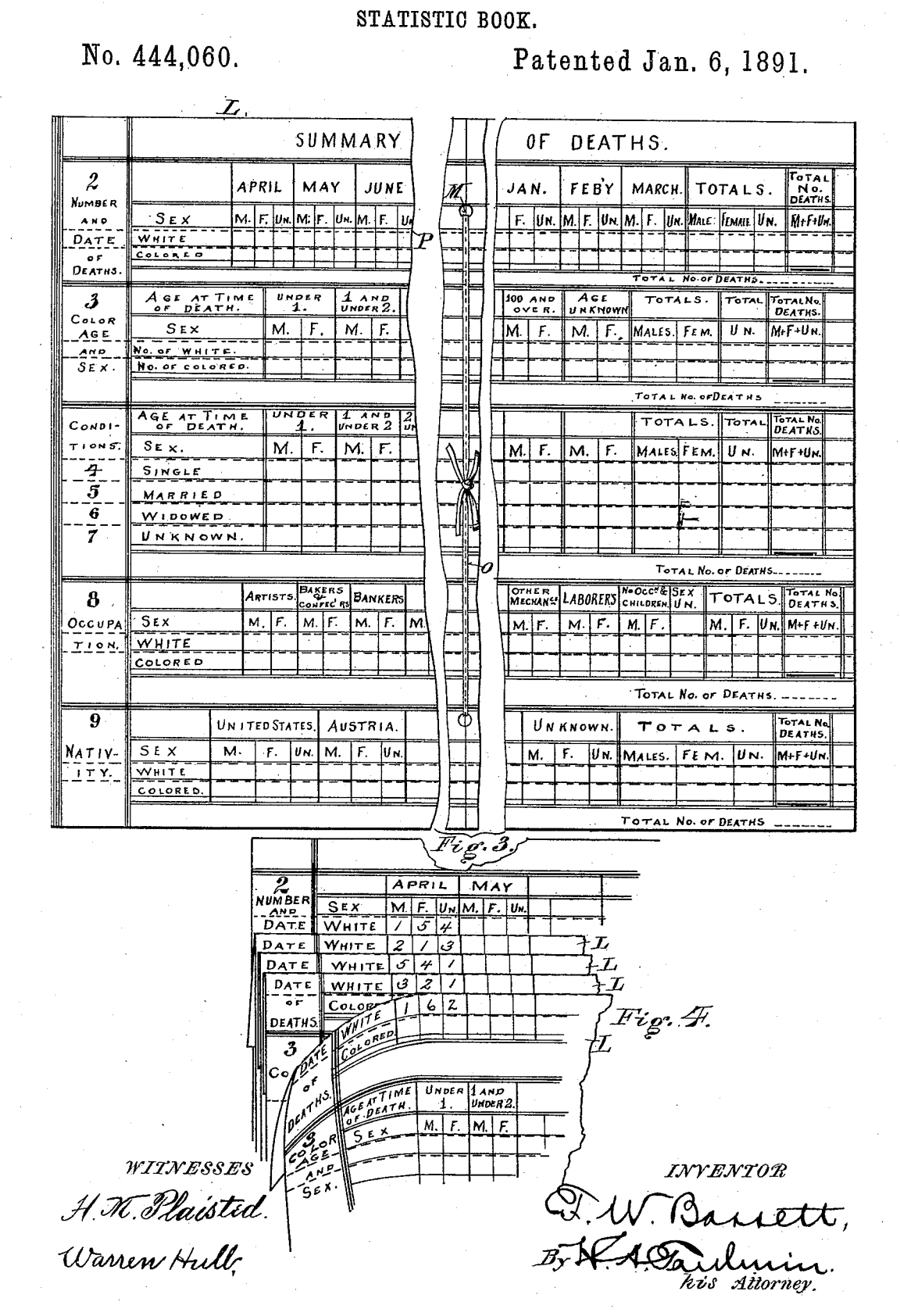

(No Model.) 2 Sheets—Sheet 2.

F. W. BARRETT.
STATISTIC BOOK.

No. 444,060. Patented Jan. 6, 1891.

*Fig. 3.*

*Fig. 4.*

WITNESSES
H. M. Plaisted.
Warren Hull.

INVENTOR
F. W. Barrett,
By H. A. Toulmin
his Attorney.

UNITED STATES PATENT OFFICE.

FREDERICK W. BARRETT, OF SPRINGFIELD, ASSIGNOR TO DURIAS D. CLAYTON, OF UPPER SANDUSKY, OHIO.

STATISTIC-BOOK.

SPECIFICATION forming part of Letters Patent No. 444,060, dated January 6, 1891.

Application filed December 23, 1889. Serial No. 334,699. (No model.)

*To all whom it may concern:*

Be it known that I, FREDERICK W. BARRETT, a citizen of the United States, residing at Springfield, in the county of Clark and State of Ohio, have invented certain new and useful Improvements in Statistic-Books, of which the following is a specification, reference being had therein to the accompanying drawings.

This invention relates to certain new and useful improvements in statistic-books to be used by canvassers of vital statistics. The feature of novelty is twofold, the first consisting in an alphabetical list of diseases arranged in classes, sub-classes, and numbers, combined with sheets ruled with proper blanks to receive statistical data, and having lines on which to write the names of the diseases and columns designated "class," "sub-class," and "number," respectively, whereby the disease written on any line may be identified with the disease in the alphabetical list by the identity of the class, sub-class, and number; and the second part consists of a detachable death-summary sheet ruled with suitable blanks for receiving the summary of statistics of this nature, to be made up from the entry-sheets above referred to, the summary-sheets having folding-lines, scores, or perforations adapting them to be folded, and one of such sheets to be arranged upon another in series, so as to present in close proximity the blanks containing corresponding data, so that such data may be computed without error from all or any number of such sheets, and which class of data can be thus separated from any other class of data, the further peculiarities of which features of novelty will be hereinafter fully described.

In the accompanying drawings, forming a part of this specification, and in which like reference-letters indicate corresponding parts, Figure 1 represents an entry-sheet opened out flat and showing two pages; Fig. 2, a view of a portion of one of such pages and of a partial alphabetical list of diseases; Fig. 3, a view of the death-summary sheet, with the cord or tape which detachably secures it to the remainder of the book; and Fig. 4, a detail perspective view of portions of a number of death-summary sheets folded and laid one upon another for computing data.

The letter A designates one of as many sheets of paper as may be required in making up the book, and these sheets are ruled with blanks, as shown in this figure, and are stitched or otherwise secured on the line B. The data corresponding with the blanks is written in by the canvasser. The extreme right-hand part of the right-hand page is divided into or ruled with columns C, D, and E, while a number of horizontal lines F cross the page and intersect these columns. On these lines F are written the names of the diseases which caused the deaths, these names being placed under the heading of "Disease or cause of death." As these diseases are to be transferred by the various probate judges into a volume to be transmitted by them to the secretary of state, it becomes necessary that the diseases be properly and clearly written and accurately spelled. As the class of canvassers who are employed cannot be expected to possess the technical information requisite to properly comply with these necessities of the work, it becomes indispensable that some means be employed to supply the deficiencies of their knowledge and for affording the probate judge an accurate record from which to make out his transcripts. This is done by incorporating in the book a number of sheets G at some suitable place, preferably in the front part. On these sheets are printed the names of almost all known diseases, and they are arranged in alphabetical order. They are also grouped so that those commencing with the same letter of the alphabet will form a group separated or spaced somewhat from the other groups. The pages are also ruled with columns H, I, and J, which are opposite to the list of diseases, and are respectively designated "class," "sub-class," and "number." This arrangement of columns and these designations correspond with the arrangement and designations already described as appearing on the entry-sheets of the book. The diseases of each group are designated by a figure indicating "class," another figure indicating "sub-class," and yet another figure indicating "number." It will now be seen that the canvasser in ascertaining the causes of deaths will write the name of the disease on one of the lines F of the entry-sheets. This done he will refer to the alphabetical list, and will select the numbers opposite to this name in the "class," "sub-class," and "number" columns, and will then enter such numbers in the columns C, B, and E of the entry-pages. Now, this book is handed over to the probate judge to transcribe this matter into a book, which he will send to the secretary of state. When he comes to do the work, he will compare the numbers in the columns C, B, and D with corresponding numbers in his book, and as these latter numbers are associated with the technical names of the diseases the judge will thus be able to record in his book the death in the right place, even though the canvasser has employed a popular or technically-erroneous name.

It is also a part of the duty of the canvasser to summarize the number of the deaths which he has entered in the book and to subdivide them according to whether "white" or "colored" and according to sex, as also according to "age," "condition," "occupation," and "nativity." For this work the book has a sheet called "summary of deaths," designated L in Figs. 3 and 4. These sheets are provided with holes M on a line near their middle, and are secured to the book in a suitable part, preferably at the back, by a tape or cord O, or by other means. They are ruled and divided into various spaces, as shown in Fig. 3. The point of novelty consists in making them detachable and in providing them with folding-lines, scores, or perforations P at such places as to expose to view any particular subdivision containing statistics of a kind or class. For instance, such a folding line, score, or series of perforations is provided above "white," so that any number of these summary-sheets may be laid one upon the other in an overlapped position and present the horizontal columns designated "white" in series one under the other, as shown in Fig. 4. Thus it will be seen that these statistics appearing in these columns can be brought close together, so that such figures as appear under the vertical subdivision "male" will come one under the other, as appear in the subdivision "female" will come one under the other, and so on throughout the whole series of vertical subdivisions. The various canvassers, as above intimated, fill in these summary sheets from the statistics they have gathered and entered in their books, and then when these numerous books with their summary sheets so filled in are handed over to the probate judge he detaches the summary sheets and folds them in the manner indicated, and computes the summaries, and enters his computations in his book, which he transmits to the secretary of state. It will also be noticed that these folding-lines occur between the "white" and "colored," as also between "sex" and "single," and "single" and "married," and "married" and "widow," and "widow" and "unknown." The value and advantage of this detachable folding-sheet adapted to the matter of overlapping one upon the other are very appreciable in practice.

Having thus fully described my invention, what I claim as new, and desire to secure by Letters Patent, is—

1. In a statistical book, the combination, with the entry-sheets ruled with lines to write on and having columns crosswise said lines and designated "class," "sub-class," and "number," of a list-sheet having alphabetical lists of diseases, and columns running crosswise to said lists and designated "class," "sub-class," and "number," and identifying characters or figures in these latter columns.

2. In a statistical book, the combination, with entry-sheets ruled with lines to write on and having blank columns designated "disease or cause of disease," and other columns designated "class," "sub-class," and "number," of a list-sheet having alphabetical lists of diseases subdivided into groups and columns running crosswise to said lists, and designated "class," "sub-class," and "number," and figures in said latter columns opposite the respective diseases, no two of said figures being of the same denomination.

3. In a statistical book, a detachable summary-sheet ruled substantially as shown and described and having different classes of statistical blanks, and a series of folding-lines between the different classes, whereby a number of said sheets may be folded and overlapped and the blanks of corresponding character on the different sheets brought into close proximity.

4. As a new article of manufacture, the herein-described statistical book, consisting of entry-sheets having lines to write on and columns running crosswise to said lines, and designated "class," "sub-class," and "number," a list-sheet having alphabetical lists of diseases arranged in groups, columns running crosswise to said lists designated "class," "sub-class," and "number," and different figures in said latter columns opposite to each disease, substantially as shown and described, and detachable summary-sheets ruled substantially as shown and described, and having different classes of blanks and folding-lines between the different classes, for the purpose set forth.

In testimony whereof I affix my signature in presence of two witnesses.

FREDERICK W. BARRETT.

Witnesses:
MAIME WILSON BARRETT,
GEO. W. YOSTING.